(12) United States Patent
Shaw

(10) Patent No.: US 6,199,931 B1
(45) Date of Patent: Mar. 13, 2001

(54) SEAT ARRANGEMENT

(75) Inventor: Jim Shaw, Coventry (GB)

(73) Assignee: Rover Group Limited, Warwick (GB)

( * ) Notice: Subject to any disclaimer, the term of this patent is extended or adjusted under 35 U.S.C. 154(b) by 0 days.

(21) Appl. No.: 09/417,318

(22) Filed: Oct. 13, 1999

(30) Foreign Application Priority Data

Nov. 11, 1998 (GB) .................................................. 9824663

(51) Int. Cl.[7] .................................................... B60H 2/02
(52) U.S. Cl. ................. 296/65.06; 296/65.1; 296/65.05; 296/65.01; 297/240
(58) Field of Search .............................. 296/65.01, 65.06, 296/65.05; 297/344.21, 344.24

(56) References Cited

U.S. PATENT DOCUMENTS

| | | | |
|---|---|---|---|
| 2,563,220 | * | 8/1951 | Doty .......................................... 155/5 |
| 3,066,979 | * | 12/1962 | Pitts et al. ............................. 297/240 |
| 4,487,452 | | 12/1984 | Tanizaki et al. . |
| 4,834,452 | * | 5/1989 | Goodrich ............................. 297/240 |
| 5,558,386 | * | 9/1996 | Tilly et al. ........................... 296/65.1 |
| 5,636,884 | * | 6/1997 | Ladetto et al. ....................... 296/65.1 |
| 5,662,368 | * | 9/1997 | Ito et al. ............................... 296/65.1 |
| 5,871,255 | * | 2/1999 | Harland et al. ...................... 296/65.1 |
| 5,971,467 | * | 10/1999 | Kayumi et al. .................... 296/65.05 |
| 6,076,880 | * | 6/2000 | Coffer et al. ....................... 296/65.01 |
| 6,089,641 | * | 7/2000 | Mattarellea et al. .............. 296/65.05 |

FOREIGN PATENT DOCUMENTS

| | | |
|---|---|---|
| 1426428 | 3/1972 | (GB) . |
| 59-89237 | * 5/1984 | (JP) . |
| 61-36028 | * 2/1986 | (JP) . |
| 63-242746 | * 10/1988 | (JP) . |

* cited by examiner

Primary Examiner—Joseph D. Pape
Assistant Examiner—Kiran B. Patel
(74) Attorney, Agent, or Firm—Davis & Bujold, P.L.L.C.

(57) ABSTRACT

A seat arrangement (2) includes seat segments (4, 5) which constitute a seat base arranged to rotate at least about a pivot corner (7) and possibly about a secondary pivot corner (10) in order to improve access through a door aperture (6) adjacent to the seat arrangement (2) to the rear of the arrangement (2). Thus, the seat arrangement (2) could constitute a bench-type configuration incorporating a driver's seat (3) which extends across the width of a motor vehicle and thereby increasing the available seating capacity of that vehicle. Additionally, through the increased access to the rear of the seating arrangement (2) the motor vehicle will be more convenient in terms of allowing vehicle occupants to sit in rear seating (1) or gain access to vehicle luggage space.

17 Claims, 2 Drawing Sheets

SEAT ARRANGEMENT

BACKGROUND OF THE INVENTION

The present invention relates to a seat arrangement and more particularly to a seat arrangement for use within a motor vehicle.

It is clearly desirable within a motor vehicle to provide adequate seating for occupants of that vehicle. A further factor is that the number of occupants within a vehicle may vary considerably between journeys and so a balance must be struck between provision of sufficient seating for occupants whilst avoiding any detrimental factors involved with providing excess seating rarely used. Thus, with regard to so called utility vehicles it is common to provide occasional or third row seating. Furthermore, it will be appreciated that consideration must be made with regard to access to seating as again provision of separate doors can significantly add to vehicle manufacturing cost, etc.

It will be appreciated that typically with a two door vehicle the front seats are arranged such that a seat back tilts forward in order to allow access to rear seating within the vehicle. Clearly, in such circumstances even if the seat is arranged to slide forward as well as tilt access to the rear seating is still limited. A similar problem is precipitated within vehicles with third row seating in that access to that seating must either be made through the rear luggage space door or potentially by scrambling past the permanent second or normal rear seat in the vehicle. In any event, such access to seating within a vehicle is at best inconvenient and at worst unacceptable for certain groups of potential vehicle occupants.

SUMMARY OF THE INVENTION

It will be understood that so called bench-type seats present the best option with regard to maximising the number of passengers that can be accommodated. Thus, it is an object of the present invention to provide a seat arrangement which allows inclusion of bench-type seating within a motor vehicle whilst improving access to other seats behind the arrangement or luggage space thereat.

In accordance with the present invention there is provided a seat arrangement for a motor vehicle, the arrangement comprising a seat with a base secured at least by a pivot corner at a first end of the base such that the base is adjacent a door and the base being rotatable about that pivot corner to move forward at a second end of the base opposite the first end in order that the seat when so rotated is askew relative to the door and so facilitate access past the seat through the door to the rear of the arrangement.

Typically, the base will rotate substantially in the same plane about the pivot corner. Alternatively, the base may be arranged to lift or drop prior to or during rotation.

The seat may have a back portion secured to the base and that back portion arranged to tilt forward relative to the base.

There may be a latch at the opposite corner to the pivot corner at the first end in order to facilitate stability of the seat.

The pivot corner may be secured to a central or transmission tunnel within a motor vehicle with support means arranged at the second end of the base to ensure appropriate presentation of the seat within the vehicle.

The seat base may be segmented with a secondary pivot corner between the segments to allow respective rotation of a base segment about that secondary pivot corner.

BRIEF DESCRIPTION OF THE DRAWINGS

An embodiment of the present invention will now be described by way of example only and with reference to the accompanying drawings in which.

DESCRIPTION OF THE PREFERRED EMBODIMENTS

Figure 1:
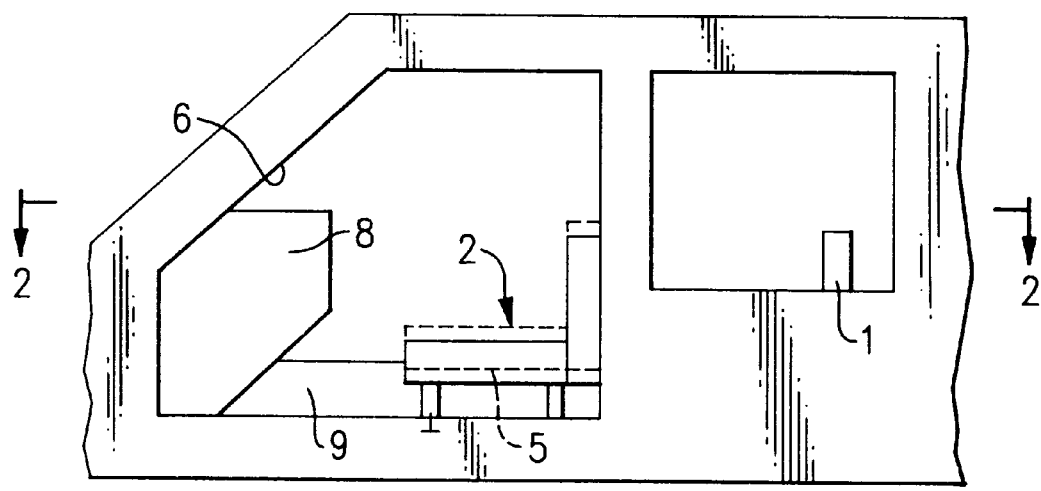
FIG. 1 is a pictorial side elevation of a seat arrangement within a motor vehicle.

In the drawings the two principal configuration states of the seat arrangement are depicted. Thus, in FIGS. 1 and 2 the seat arrangement is shown in a normal driving position configuration whilst in FIGS. 3 and 4 the seat arrangement is depicted in a configuration to allow easy access to the rear of the seat arrangement. Clearly, the rear of the seat arrangement could incorporate a further seat or be designated as a storage/luggage compartment within a vehicle.

Figure 2:
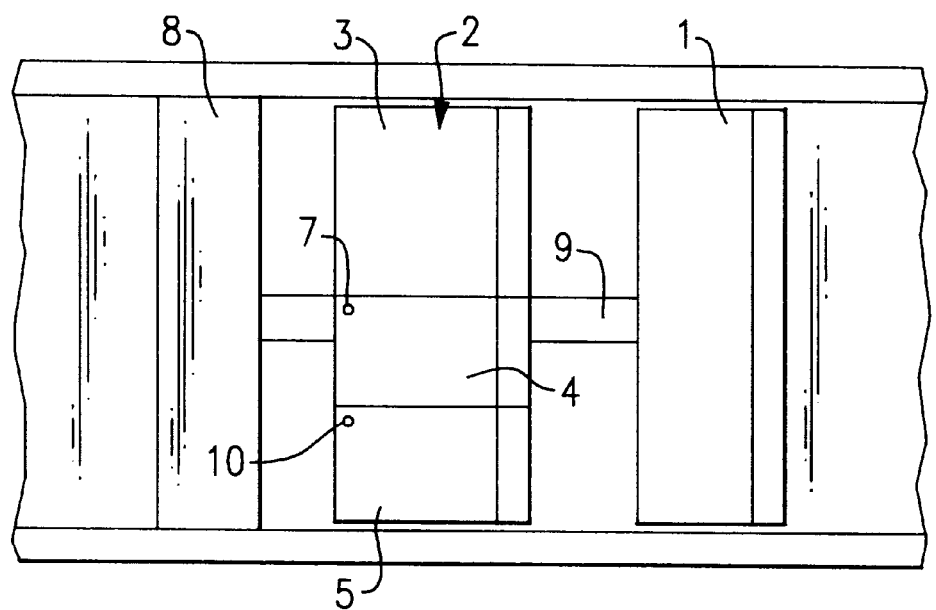
FIG. 2 is a pictorial plan view of the seat arrangement illustrated in FIG. 1 in the direction 2—2.

With regard to the normal configuration illustrated in FIGS. 1 and 2 it will be appreciated that normally at least two rows of seats are arranged substantially parallel with respect to each other to accommodate front and rear occupants of a vehicle. Thus, as illustrated in FIGS. 1 and 2 a rear seat 1 is located behind a seat arrangement 2 which, in the embodiment depicted, takes a bench-like form. This seat arrangement 2 comprises a driver's seat 3 and respective base seat segments 4, 5. Clearly, the seat arrangement 2 includes both a base, comprising the segments 4,5, and a back portion upon which occupants of a vehicle sit.

Figure 3:
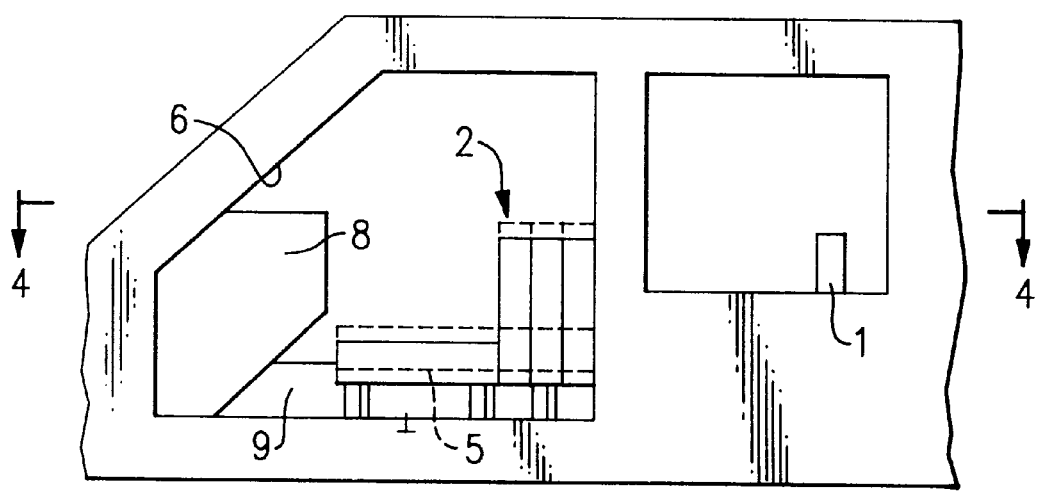
FIG. 3 is a pictorial side elevation of a seat arrangement rotated in accordance with the present invention within a motor vehicle; and, FIG. 4 is a pictorial plan view of a seat arrangement depicted in FIG. 3 in the direction of 4—4.
Figure 4:
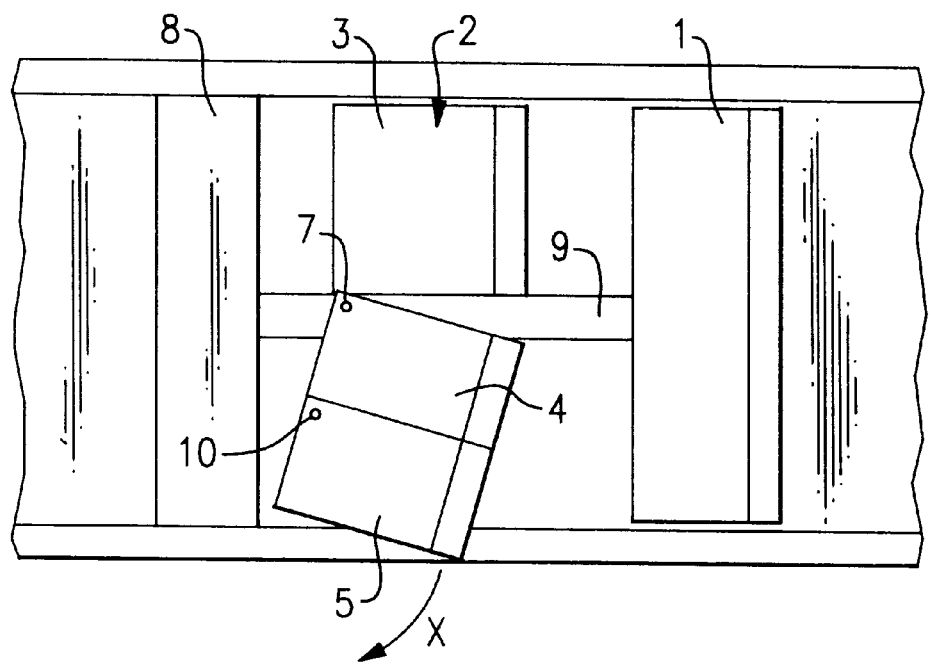

In accordance with the present invention access to the rear seat 1 will typically be made through a front door aperture 6 located adjacent the seat segment 5. Thus, the illustrated vehicle is of a so called 2 door type. In order to gain access to the rear seat 1 in accordance with the invention the seat segments 4, 5 rotate about a pivot corner 7 in the direction of arrowhead X. FIGS. 3 and 4 illustrate the seat segments 4, 5 rotated in the direction of arrowhead X in order to increase the gap G available for access to the rear seat 1 through the aperture 6.

The segments 4, 5 pivot about the pivot corner 7 to an extent principally determined by engagement with other parts of the vehicle such as dashboard 8. In any event, it will be appreciated that the segments 4, 5 are substantially askew relative to the door aperture 6. A gap between the seat segments 4, 5 and a middle or B post 19 of a motor vehicle is presented upon rotation. Clearly, the back portions of the seat arrangement 2 may also tilt forwards about pivots at the rear of each segment 4, 5 in order to further increase the cross-section available for access to the rear seating 1. It will also be understood that rather than rear seating 1 the area behind the seat arrangement may be arranged for storage or luggage within the motor vehicle.

A particular advantage with regard to the present invention is that it allows a substantially bench configuration for the seat arrangement at the front of a vehicle. Thus, a wider seating area is available for vehicle occupants. This has particular advantages within automatic vehicles where transmission controls may be mounted upon the steering column and thus the gear lever is not required in a central console or transmission tunnel 9 typical of a motor vehicle. Thus, the seat segments 4, 5 are arranged to extend over this central console or tunnel 9 with the pivot corner 7 appropriately mounted to this tunnel 9 to allow the rotation described above. In such circumstances, a first end including the pivot corner 7 will be appropriately secured to the tunnel 9 through that pivot corner 7 mounting and a latch whilst the opposite second end will be secured adjacent the door aperture 6 with appropriate support/latch mechanisms such that the seat arrangement 2 is substantially square within the motor vehicle. Clearly, the tunnel 9 at the first end ensures that the seat arrangement is raised from the vehicle floor whilst the second end will normally be supported upon legs such that the seat segments 4, 5 have respective base portions robustly held in a substantially flat presentation.

It will be understood that the seat segments 4, 5 could be combined into a single base segment wholly rotatable about the pivot corner 7 but that it is more convenient to have two segments 4, 5 for increased flexibility within a vehicle. Thus, a secondary pivot corner 10 could be provided such that the seat segment 4 can remain in place whilst seat segment 5 is rotated about that secondary pivot corner 10 in order to provide improved access to the rear seat 1. In such circumstances, the pivot corner 7 would be locked whilst the secondary pivot corner 10 is released for rotation.

Normally, as illustrated the seat segments 4, 5 will rotate in unison in substantially the same plane about the pivot corner 7 towards the dashboard 8 in the direction of arrowhead X. However, it will be appreciated where necessary in order to either delay or eliminate potential for early fouling by the segments 4, 5 with other features within the vehicle that, these segments 4, 5 upon rotation about the pivot corner 7, either prior to such rotation or progressively through such rotation, could be uplifted or dropped down as required.

As indicated above normally the seat arrangement will essentially comprise a base portion to which a back portion is secured normally through a pivotable hinge along a back edge of the base portion. Thus, this back portion will be allowed to tilt forward relative to the base in order to further improve the cross-section available for access past the seat arrangement 2.

Clearly, it is most important that the seat arrangement 2 when in the driving configuration as depicted in FIGS. 1 and 2 is securely mounted within a motor vehicle. Thus, appropriate latching and supports will be provided beneath the seat arrangement 2 which is sufficiently robust and mounted for safety within the vehicle particularly during collisions etc. However, in the rotated or access configuration depicted in FIGS. 2 and 3, it will be understood that such robustness for securing the seat arrangement 2 in this configuration is not necessary. This access configuration is normally transitory while access to the rear of the seat arrangement 1 is necessary. In such circumstances, a simple friction latch or hasp-type retention of the seat arrangement 2, and in particular seat segments 4, 5 in their rotated positions, may be all that is necessary.

It will be appreciated that in accordance with the present invention at least a proportion of the seat arrangement 2 is rotatable about an inboard pivot i.e. pivot corner 7 or secondary pivot corner 10 such that better access to the rear of the seat arrangement 2 is allowed with little effort. Previously, relatively complicated systems have been necessary with regard to seating in order to gain such access and these systems involving sliding, tilting and folding of the seat. These systems clearly increase cost and complexity of installation within a motor vehicle.

Although illustrated with regard to the front seat within a motor vehicle it will be appreciated that a seat arrangement in accordance with the present invention could be incorporated within a vehicle as the second row of seating with appropriate rotation about respective pivot corners to allow access to an auxiliary or third row of seating behind that second row and/or the luggage/boot area of the vehicle.

It will be appreciated that the seat segments 4, 5 could be incorporated into a single base portion with respective tiltable back portions secured to that one base. Thus, when the seat portion 4 is not required by a vehicle occupant its back portion could be folded down to provide a flat surface or table. Alternatively, this central back portion could be detachable.

Clearly, the present invention has particular ability with regard to two door vehicles such as pick-up vans and utility vehicles were ready access to the rear of those vehicles whether it be to use rear seating or retrieve/deposit items in a luggage area of the vehicle.

Although as indicated it is typical that the pivot corner about which the seat arrangement rotates is forward and centrally inboard of a motor vehicle it will be appreciated that alternatively the pivot corner about which the seat arrangement rotates could be located at any of the other principle corners of the segments 4, 5, i.e. at the second end of the base immediately adjacent to the door aperture, provided fouling with other surfaces or structures within the vehicle is avoided. Thus, if the central segment 4 does not extend over the transmission 9 such that the pivot corner is arranged to one side of that tunnel it will be appreciated that there is a gap within which the segment 4 can rotate, i.e. either with or opposite to the direction of arrowhead X, towards the driver's seat about a pivot corner at the front or rear of that segment 4. Similarly, the seat segment 5 could incorporate a pivot corner located at a front or rear edge near the door aperture such that again the segments 4, 5 could rotate there about into the gap between the driver's seat and the segments 4, 5. In either event, the seat arrangement 2 may be rotated into an askew position with regard to the door aperture 6 in order to achieve greater access to the rear of the arrangement.

What is claimed is:

1. A seat arrangement in a motor vehicle having a door aperture, the seat arrangement comprising a seat with a base having a first end secured to the motor vehicle by at least a fixed pivot corner, and a movable second end of the seat being located adjacent the door aperture, and the base is rotatable about a vertical axis, defined by the pivot corner, to move the second end of the base from an aligned position extending substantially perpendicular to the door aperture to a skewed position in which the second end of the base partially projects into the door aperture to facilitate access through the door aperture past the seat to a rear compartment located behind the seat arrangement.

2. The seat arrangement according to claim 1, wherein the base rotates substantially in a horizontal plane.

3. The seat arrangement according to claim 1, wherein the base one of lifts up and drops down, relative to the pivot corner, prior to commencing rotation of the base about the pivot corner.

4. The seat arrangement according to claim 1, wherein the base one of progressively lifts up and progressively drops down, relative to the pivot corner, during rotation of the base about the pivot corner.

5. The seat arrangement according to claim 1, wherein the seat includes a back portion secured to the base and the back portion is arranged to tilt forward relative to the base to improve the access to the rearward compartment of the motor vehicle located immediately rearwardly behind the seat arrangement.

6. The seat arrangement according to claim 1, wherein the base includes a latch located opposite the pivot corner to secure the base relative to the door aperture and facilitate remote operation of the pivot corner.

7. The seat arrangement according to claim 1, wherein the motor vehicle includes at least one of a central console and a transmission tunnel, the pivot corner is secured, via a mounting, to one of the central console and the transmission tunnel, and support means are provided at the second end of the base for supporting the base.

8. The seat arrangement according to claim 1, wherein the base includes at least two segments and a secondary pivot corner is located in a region adjacent the two segments to allow one of the two segments to rotate relative to the other of the two segments and facilitate access past the seat through the door aperture to the rear compartment located behind the seat arrangement.

9. A motor vehicle having two opposed door apertures providing access to an interior of the motor vehicle, the two opposed door apertures solely providing access to a seat arrangement and a rearward compartment of motor vehicle located immediately rearwardly behind the seat arrangement, the seat arrangement comprising at least one seat with a base secured adjacent a first end thereof by at least one fixed pivot corner such that the at least one seat is rotatable in a horizontal plane about a vertical pivot axis defined by the pivot corner, and upon rotation of the at least one seat about the pivot corner, a portion of the seat arrangement located adjacent a first one of the two opposed door apertures moves, on support legs supporting the base, so as to be located in a skewed position, relative to the first one of the opposed door apertures, and partially projects into the first one of the opposed door apertures and thereby increases a gap, between the seat and the first one of the opposed door apertures, providing access to the rearward compartment of the motor vehicle located immediately rearwardly behind the seat arrangement to improve access to the rearward compartment.

10. The motor vehicle with the seat arrangement according to claim 9, wherein the base one of lifts up and drops down, relative to the pivot corner, prior to commencing rotation of the base about the pivot corner.

11. The motor vehicle with the seat arrangement according to claim 9, wherein the base one of progressively lifts up and progressively drops down, relative to the pivot corner, during rotation of the base about the pivot corner.

12. The motor vehicle with the seat arrangement according to claim 9, wherein the seat includes a back portion secured to the base and the back portion is arranged to tilt forward relative to the base to improve the access to the rearward compartment of the motor vehicle located immediately rearwardly behind the seat arrangement.

13. The motor vehicle with the seat arrangement according to claim 9, wherein the base includes a latch located opposite the pivot corner to facilitate remote operation of the pivot corner and pivoting movement of the base, and the latch, when in an un-operated position, secures the base relative to the first one of the opposed door apertures in an orientation extending substantially transversely between the opposed door apertures.

14. The motor vehicle with the seat arrangement according to claim 9, wherein the motor vehicle has one of a central console and a transmission tunnel, and the pivot corner is secured to one of the central console and the transmission tunnel, and support legs are provided at the second end of the base to facilitate pivoting of the seat arrangement.

15. The motor vehicle with the seat arrangement according to claim 9, wherein the seat base includes at least two segments and a secondary pivot corner is located in a region adjacent the two segments to allow one of the two segments to rotate relative to the other of the two segments and facilitate access past the seat through one of the two opposed door apertures to improve the access to the rearward compartment of the motor vehicle located immediately rearwardly behind the seat arrangement.

16. The motor vehicle with the seat arrangement according to claim 9, wherein a rearward seat arrangement is located in the rearward compartment of the motor vehicle located immediately rearwardly behind the seat arrangement.

17. A motor vehicle having two opposed door apertures providing access to an interior of the motor vehicle, the two opposed door apertures solely providing access to a seat arrangement and a rearward compartment of motor vehicle located immediately rearwardly behind the seat arrangement, the seat arrangement comprising at least one seat with a base secured adjacent a first end thereof by at least one fixed pivot corner such that the at least one seat is rotatable in a horizontal plane about a vertical pivot axis defined by the pivot corner, and upon rotation of the at least one seat about the pivot corner, a portion of the seat arrangement located adjacent a first one of the two opposed door apertures moves, on support legs supporting the base, so as to be located in a skewed position, relative to the first one of the opposed door apertures, and partially projects into the first one of the opposed door apertures and thereby increases a gap, between the seat and the first one of the opposed door apertures, providing access to the rearward compartment of the motor vehicle located immediately rearwardly behind the seat arrangement to improve access to the rearward compartment; and the seat base includes at least two segments and a secondary pivot corner is located in a region adjacent the two segments to allow one of the two segments to rotate relative to the other of the two segments and facilitate access past the seat through one of the two opposed door apertures to improve the access to the rearward compartment of the motor vehicle located immediately rearwardly behind the seat arrangement.

* * * * *